Oct. 12, 1948.                C. F. ROSSETTER                    2,451,120
            CABINET HAVING MEANS FOR MOVING COMPARTMENTS
                        VERTICALLY AND HORIZONTALLY
Filed Aug. 21, 1944                                    6 Sheets-Sheet 3
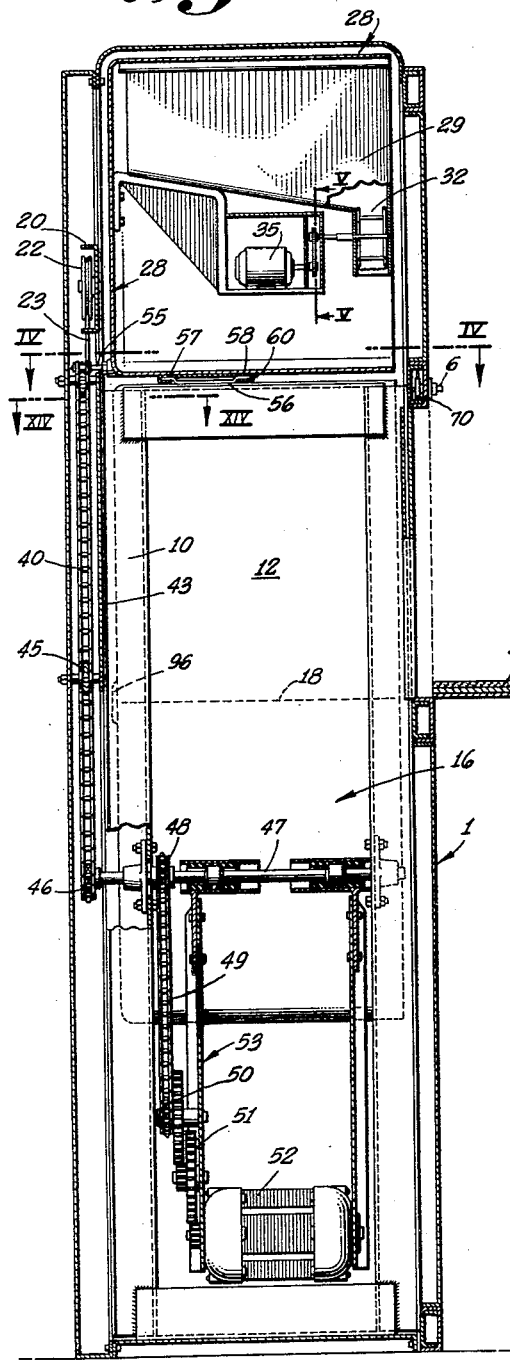
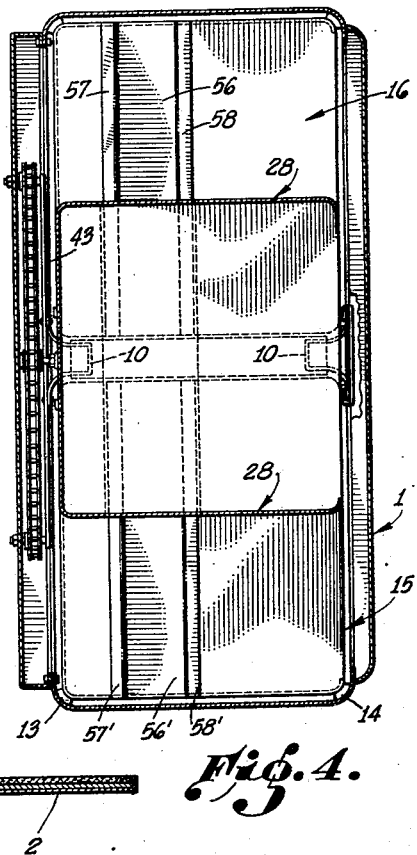
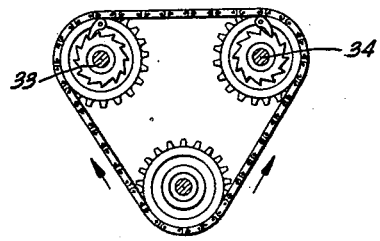
CHARLES F. ROSSETTER
        INVENTOR.
BY
            ATTORNEY.

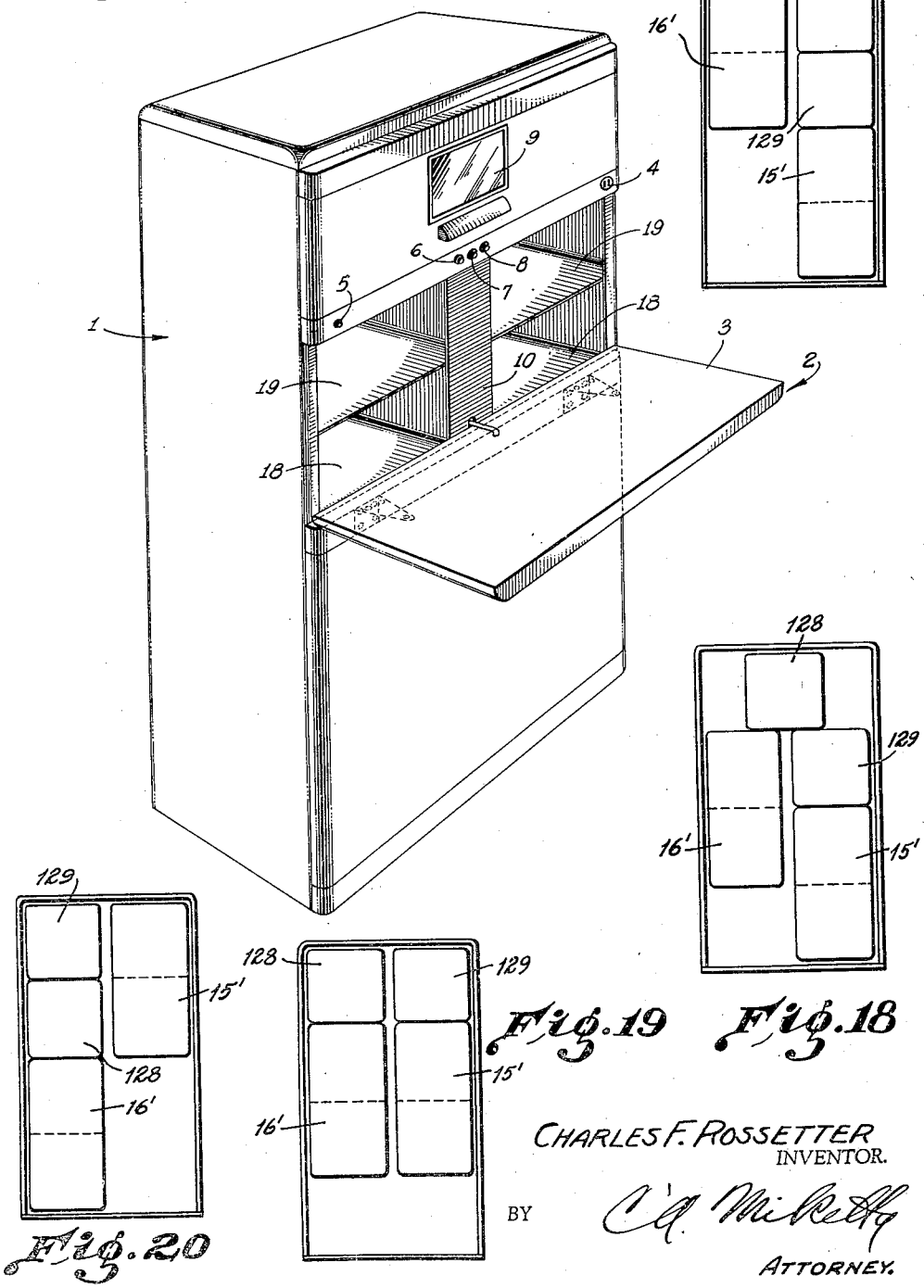

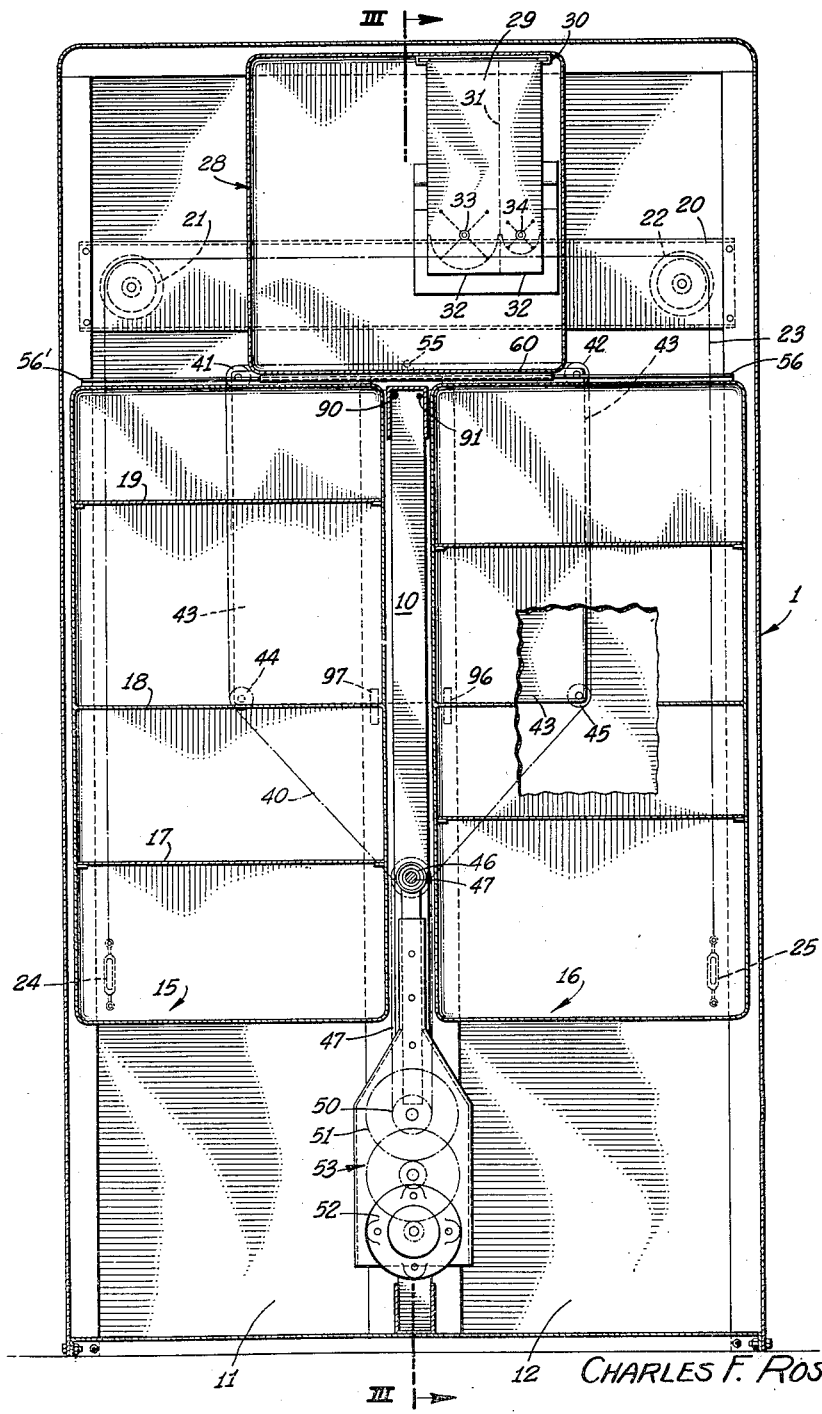

Oct. 12, 1948.   C. F. ROSSETTER   2,451,120
CABINET HAVING MEANS FOR MOVING COMPARTMENTS
VERTICALLY AND HORIZONTALLY
Filed Aug. 21, 1944   6 Sheets-Sheet 4

CHARLES F. ROSSETTER
INVENTOR.
BY
ATTORNEY.

Oct. 12, 1948.                C. F. ROSSETTER                 2,451,120
         CABINET HAVING MEANS FOR MOVING COMPARTMENTS
                    VERTICALLY AND HORIZONTALLY
Filed Aug. 21, 1944                                    6 Sheets-Sheet 5

CHARLES F. ROSSETTER
INVENTOR.

BY
ATTORNEY.

Oct. 12, 1948.   C. F. ROSSETTER   2,451,120
CABINET HAVING MEANS FOR MOVING COMPARTMENTS
VERTICALLY AND HORIZONTALLY
Filed Aug. 21, 1944   6 Sheets-Sheet 6

CHARLES F. ROSSETTER
INVENTOR.

BY
ATTORNEY.

Patented Oct. 12, 1948

2,451,120

UNITED STATES PATENT OFFICE 2,451,120

CABINET HAVING MEANS FOR MOVING COMPARTMENTS VERTICALLY AND HORIZONTALLY

Charles F. Rossetter, Los Angeles, Calif.

Application August 21, 1944, Serial No. 550,377

27 Claims. (Cl. 312—151)

This invention pertains to a household appliance or cabinet in which cooking utensils, food stuffs, condiments and supplies may be kept in an accessible, compact manner. In order to facilitate description, the device of this invention will be hereinafter referred to as the "Utensilator." Although the Utensilator will be described in its adaptation and use in the kitchen, it is to be remembered that the same device may be employed as a service cabinet in dentists' offices, stores, tool departments of manufacturing plants, and elsewhere.

Pots, pans, flour, condiments, rolling pins, mixers, graters and other paraphernalia found in a kitchen, are usually stored in drawers or in cupboards which are scattered throughout the kitchen. Pots and pans are ordinarily kept in cupboards which are dark, difficult of access and in which a semblance of order is difficult to maintain. The average housewife is subjected to considerable exercise in rummaging through cupboards in an attempt to locate a pot or pan of the desired shape and size. Many steps are taken in assembling the various tools and materials used in preparing a meal. Due to the depth of sinks under which cupboards generally extend, it is impossible to use a sufficient number of shelves so as to permit each implement to occupy a readily available and accessible point of storage. As a result, the storage of the tools and equipment used in an average kitchen takes up a large number of cubic feet of space.

The Utensilator of this invention provides a definite and proper place for each pot, pan or other tool employed in a kitchen and by proper arrangement, it is possible to make readily available to the housewife all of the correlated tools and supplies needed for a given operation. For example, the Utensilator of this invention may be so arranged as to bring to a satisfactory and desirable working table level all of the equipment and materials necessary for baking; if desired, the Utensilator will bring to the operating table level all of the equipment necessary or desirable for roasting, etc. Moreover, these tools and materials will be found to occupy but little space in the kitchen, thereby permitting kitchens to become more compact and at the same time more efficient in operation.

Generally stated, the Utensilator comprises a housing which may be of any desired height but which need not exceed six feet in height. Within the Utensilator are movable compartments arranged in two wells, the compartments being vertically movable in such wells in opposite directions, the compartments in one well being counterbalanced by the compartments in the other well. In order to effectively utilize the space within the housing, a laterally movable compartment unit is provided, said laterally movable unit shifting from one well to another out of the way of vertically movable compartments, thereby permitting the utilization of most of the space within the housing. A horizontally extending door is provided which, when opened, forms a work table, thereby increasing the generally meager table facilities of a kitchen. Each compartment may be provided with shelves or sub-divisions adapted to receive and hold specialized tools, food stuffs, condiments, mixers, graters and other culinary adjuncts. It is to be understood that the door permits access to adjacent compartments simultaneously.

In order to economically utilize the space, the motor or driving means employed is preferably mounted upon a pivoted hanger capable of swinging out of the way of a down-coming compartment. A low center of gravity is imparted to the entire device by the elimination of unused space therein and by permitting the motor to swing out of the way in the manner described. The electrical circuit associated with the motor and embodied in the Utensilator preferably includes an improved type of reversing switch, hereinafter described in greater detail, and safety devices which necessitate the use of both hands in actuating the switches, so that the housewife is not injured by placing her hand within the Utensilator during movement of the compartments therein.

An object of the present invention, therefore, is to disclose and provide an apparatus for the storage of various materials whereby the contents of the device may be made readily accessible to the operator at a desired level.

A further object of the invention is to disclose and provide a compact unit having a large shelf area within a limited volumetric space.

Another object is to provide an apparatus which includes movable compartments whereby the materials within said compartments are selectively and mechanically brought into accessible position.

These and other objects, uses, advantages, adaptations and modifications of the invention will become apparent to those skilled in the art from the following description of an exemplary form of the invention. In order to facilitate understanding, reference will be had to the appended drawings, in which:

Fig. 1 is a perspective view of one form of apparatus embodying the elements of this invention.

Fig. 2 is a front section in elevation with the front panel of the outer housing removed.

Fig. 3 is, in general, a vertical transverse section taken approximately along the plane III—III of Fig. 2, certain elements such as vertical element 10 being in elevation and partly broken away.

Fig. 4 is a horizontal section taken along the plane IV—IV of Fig. 3.

Fig. 5 is a transverse section taken along the plane V—V of Fig. 3.

Figs. 17 to 20, inclusve, are schematic representations showing a modified form of device involving two laterally movable compartments, the views depicting the positions assumed by the compartments during operation.

Fig. 1 appended hereto is a perspective view of one form of device embraced by this invention and as is shown in this drawing, the device comprises a housing, generally indicated at 1, provided with a door 2 adapted to form a work table 3 when in horizontal open position. Suitable means are provided for maintaining the door in this horizontal position when open and it is not necessary to go into the details of the hinge and stop construction employed.

Preferably, the over-all height of the housing 1, for household use, may be in the neighborhood of six feet. The height of the table portion 3 which is formed by the door is between 36 and 40 inches. A utility outlet for electrical appliances is indicated at 4, a safety switch of the push button type at 5, and a main operating switch having the push buttons 6, 7 and 8 may be arranged in the center of the machine immediately above the door 2. A mirror, clock or other device may be provided at 9.

Figure 14:
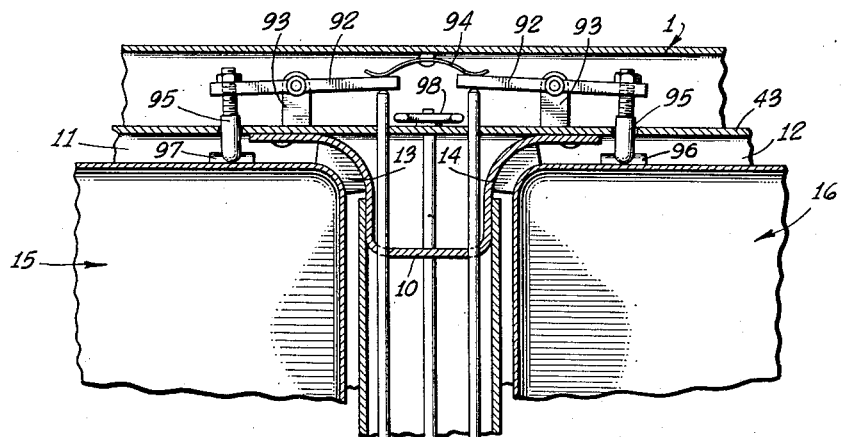
Fig. 14 is a transverse section taken along the plane XIV—XIV of Fig. 3.

The housing 1 may be made of pressed sheet metal and includes an intermediate vertical partition 10 terminating immediately above the upper edge of the door 2 when closed. The partition and the outer walls of the housing form two wells, generaly indicated at 11 and 12. Vertically extending corner guides are provided in each well, certain of the corner guides being indicated at 13 and 14 in Fig. 4. The partition 10 may be hollow so as to space the two wells which are defined by the guides. The partition, as well as the intermediate guides, terminates slightly above the upper edge of the door opening so as to permit the two wells to be in open communication with each other in the upper portion of the housing. The partition may be provided with laterally extending flanges at its vertical edges as shown in Fig. 14.

A vertically movable compartment is positioned in each of the wells 11 and 12. By referring to Fig. 2 it will be seen that a compartment 15 is positioned in the well 11 and another compartment 16 is positioned in well 12. Each of these compartments is provided with suitable shelves, such as the shelves 17, 18, 19, etc. It is to be understood that each of these compartments is open at the front so that materials carried therein may be reached through the opening in the housing formed by the door 2. In a household Untensilator the compartment 15 is substantially as long as the distance from the bottom of the housing to the level of the work table 3 formed by the door 2.

The housing 1 includes a horizontally extending transverse member 20 provided with sheaves 21 and 22 carrying a flexible cable 23, the ends of the cable being attached to the bottom portions of the two compartments 15 and 16 as, for example, at 24 and 25. In Fig. 2 the cable 23 is shown attached to the outer rear wall portions of the compartments so that the two compartments 15 and 16 are counterbalanced and suspended by means of the cable 23. Another suspension cable 23' may connect the inner opposing surfaces of the two compartments and pass over a single sheave 21', points of connection between the ends of the cable 23' and the compartments being indicated at 151 and 161.

A laterally movable compartment 28 is shown in the upper portion of the housing 1 (Fig. 2). This laterally movable compartment is preferably approximately one-half the height of compartments 15 and 16. In the embodiment shown in the drawings, this compartment 28 is provided with sub-compartments or a container 29 slidable into and out of the compartment 28 along guides 30 mounted in the top of compartment 28. The container 29 may be provided with a transverse partition 31, thereby dividing the container or bin 29 into two portions adapted to receive different granular or powdered substances or commodities such as, for example, flour and sugar. Each of these bins may be provided with a separate spout such as 32 (Fig. 3) and a sifter may be included in each spout. For example, a separate beater or agitator may be mounted on each of the shafts 33 and 34 and, as more specifically shown in Fig 5, these shafts may be driven by means of a small reversible motor 35. A common chain may connect the motor 35 with suitable sprockets on the shafts 33 and 34 but the sprockets may be loosely journaled on the shafts. When the chain revolves in one direction, however, one of the shafts, such as shaft 34, is driven by the sprocket journaled thereon by reason of a pawl and ratchet, the pawl being carried by the sprocket and the ratchet being carried by the shaft. A reverse ratchet and pawl arrangement is carried on the other shaft 33 so that in the event the motor 35 is reversed, only shaft 33 will rotate and not shaft 34. Suitable control buttons may be carried by the front of the bin or container 29 so as to selectively energize the desired beater shaft or sifter in the desired compartment of the hopper 29. The entire unit may be removed from the laterally movable compartment 28 along the horizontal guides 30, as will be evident to those skilled in the art.

Means are provided for laterally moving the compartment 28 from one well to another. Such means may include a continuous chain 40 mounted on suitable sprockets, such as the sprockets 41 and 42 journaled upon studs attached to a horizontally extending transverse member 43 which is held by partition 10. Additional sprockets 44 and 45 (also suitably journaled in 43) cause portions of the chain to extend vertically down the center back of each well. The chain also passes over a sprocket 46 mounted on a shaft 47 in the lower portion of the housing, such shaft 47 bearing a sprocket 48 driven by means of chain 49 from a sprocket 50 which is mounted on a shaft driven by suitable gearing, generally indicated at 51, connecting such shaft with a motor 52. The motor 52 as well as the gearing 51 and sprocket 50 may be suspended in a mounting 53 pivoted upon the shaft 47.

The laterally movable compartment 28 is provided with a pin 55 connected to the chain 40 so that when the chain 40 is driven, motion is imparted to the laterally movable compartment 28 so as to move it from well 11 to well 12 and vice versa. In Fig. 2 the compartment 28 is shown at an intermediate position.

Interlocking guides are carried by the tops of compartments 15 and 16 and cooperating guides are carried by the bottom of the laterally movable compartment 28. These guides are best illustrated in Figs. 3 and 4. It will be seen that the top of compartment 16 carries a laterally extending guide means 56 having horizontally extending wings 57 and 58. The top of compartment 15 has a similar arrangement, indicated by the numerals 56', 57' and 58'. The bottom of laterally movable compartment 28 is provided with inwardly extending guide means 60 adapted to engage the wings 57 and 58 so that positive engagement exists between the laterally movable compartment 28 and one or both of the compartments 15 and 16 at all times.

Before discussing the details of the driving mechanism, the movements of the compartments is actual operation should be described. At an intermediate position, such as is shown in Figs. 2 and 3, the compartments 15 and 16 are balanced and occupy equivalent levels with the laterally movable compartment 28 at an intermediate position and in engagement with both of the vertically movable compartments 15 and 16. It will be noted that the motor mounting 53 hangs vertically from the transverse shaft 47. In this intermediate position, the upper halves of compartments 15 and 16 are made available through the door 2 to the user of the device. At one extreme position the compartment 15 is lowered substantially to the floor and compartment 16 is raised into its uppermost position. In moving from the position shown in Fig. 6 to the position shown in Fig. 7, the continuous chain 40 has been energized by the motor so as to first move the laterally movable compartment 28 onto the top of compartment 15 and to then move compartments 28 and 15 downwardly so as to permit access to the contents of compartment 28 and the lower portion of compartment 16. Attention is called to the fact that the motor mounting 53 has been moved out of position and has swung from shaft 47 to one side so as to permit compartment 15 to move to the floor.

Figure 8:
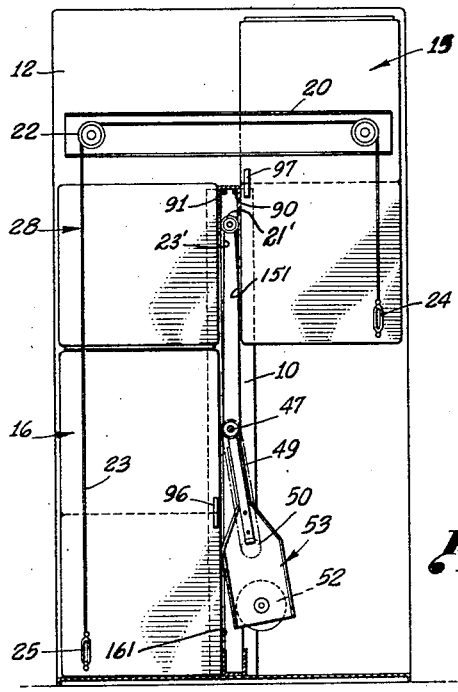

In another extreme position, illustrated in Fig. 8, access has been given to the contents of the lower portion of compartment 15 and to the laterally movable compartment 28. In the position shown in Fig. 8, compartment 15 is at the uppermost portion of its travel and compartment 16 is virtually resting on the floor. Compartment 28 is now interlocked with compartment 16.

Figure 6:
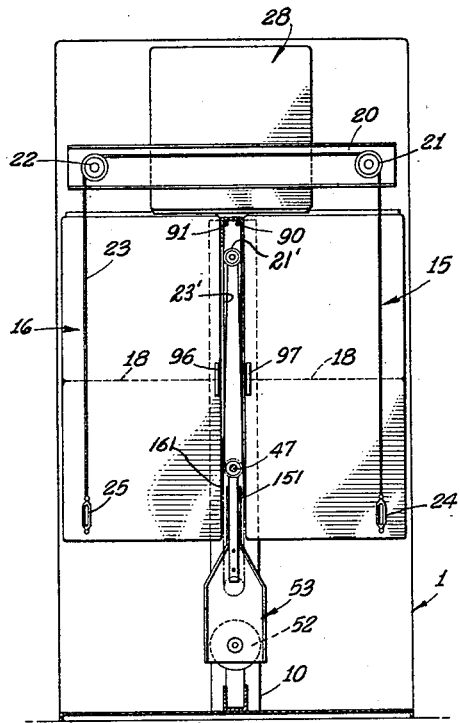
Figs. 6, 7 and 8 are rear views, partly diagrammatic, showing the compartments in different positions assumed during the operation of the apparatus.
Figure 7:
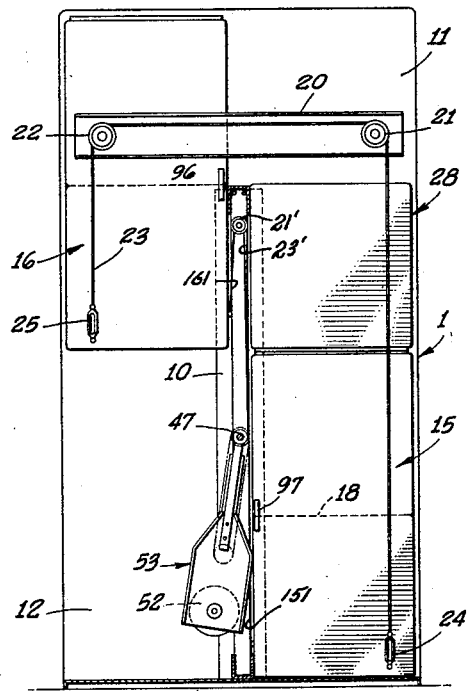

It is to be remembered that in moving from this extreme position (Fig. 8) to an intermediate position such as is shown in Fig. 6, compartment 16 is lifted by the application of power from the chain 40 to compartment 28 but since compartment 28 is interlocked through the guide means 56 and 60 with compartment 16, vertical motion imparted to compartment 28 is transmitted to compartment 16. When compartment 28 reaches its upward limit of travel, it simultaneously reaches the horizontal portion of the chain 40 between sprockets 41 and 42 and therefore moves laterally from the top of compartment 16 onto the top of compartment 15 and comes into engagement with the interlocking guide means carried by the top of the rear compartment.

In order to accomplish these movements of the compartments in a safe, efficient and simple manner, an electrical circuit is provided including the reversible motor 52, a reversing switch for said motor, the separate push button type safety switch 5 in series with the reversing switch, a brake release coil adapted to be energized when an actuating circuit is closed, automatic circuit breaking means actuated by the movement of the compartments and adapted to place the reversing switch in neutral position, and means for locking said reversing switch and automatically stopping and centering the apparatus at an intermediate position. It is to be understood that all of these devices need be included only in a preferred and highly developed form of the invention since some of the elements may be completely eliminated if it is desired so to do.

Figure 11:
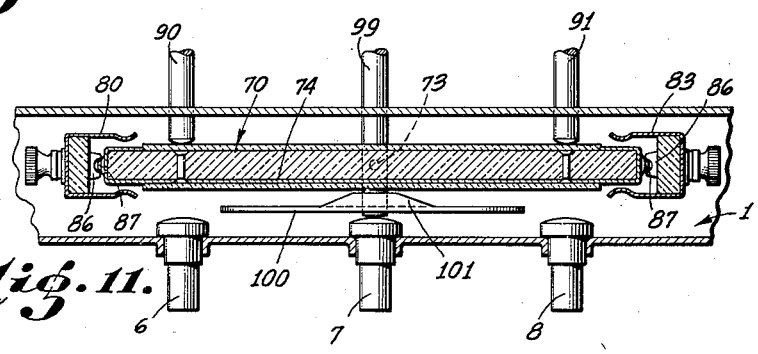
Figs. 11 and 12 are horizontal sections taken along the planes XI—XI and XII—VII respectively, of Fig. 10.
Figure 12:
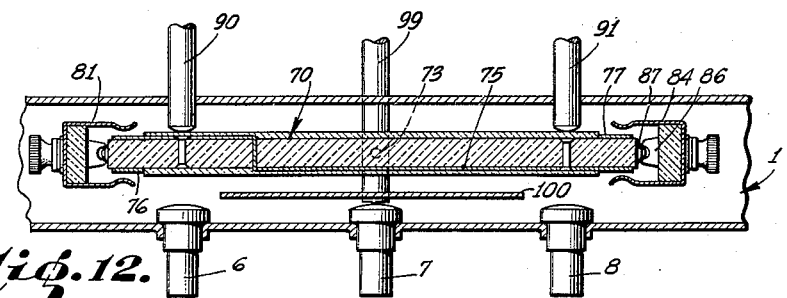

In order to conserve space and furthermore, in order to permit the device to automatically center itself, a compact, flat, rocker type, snap action reversing switch has been devised, this switch being shown in detail in Figs. 10 to 13, inclusive. The reversing switch is preferably positioned in line with the transverse partition 10 and immediately above the door 2 and is actuated by the three push buttons 6, 7 and 8. Generally stated, the reversing switch comprises a flat rectangular body member 70 made of suitable dielectric material and is mounted upon brackets 71 and 72 which engage a vertical pivot pin 73 extending through the body portion 70 so that the entire switch may pivot around an axis formed by the pin 73. Horizontal conductors are carried by the body portion 70. One of the horizontal conductors 74 is exposed on both the front and back sides of the body portion 70 at both ends of the switch whereas the other two horizontal and parallel conductor bars, such as bar 75, are exposed at the forward face on one side of the switch and on the rear face at the opposite side of the switch, as shown in Fig. 12. Vertical cross-connections or cross-conductor bars are shown at 76 and 77, these cross-conductors being exposed on opposite faces, the cross-conductor 76 being on the front face and opposite the horizontal members 75 and 75' whereas the cross-conductor 77 is exposed on the rear face and at the opposite side of the switch. Double contact terminals in the form of yokes are indicated at 80, 81 and 82, in position to cooperate with the left side of the switch, and similar double contact terminals 83, 84 and 85 are shown in position to cooperate with the right hand side of the switch. The reversing switch may be of the snap action type and a suitable detent 86 may cooperate with a spring or spring-actuated ball 87 carried by the end of the reversing switch for the purpose of causing the switch to snap into neutral position or to a contact position on both sides of the neutral point. It is to be understood that the various double contact terminals 80 to 85 inclusive are suitably spaced and mounted upon suitable insulating bars or rods, the terminals 80 and 83 being adapted to act upon the parallel conductor bar 74 whereas the remaining terminals are in position to cooperate with the contact bars 75 and 75' as well as the cross-conductors 76 and 77.

Means are provided for normally maintaining the reversing switch 70 in an intermediate or neutral position illustrated in Figs. 11 and 12 and for breaking the circuit and moving the switch into neutral position at the end of travel of the compartments 15 and 16 of the device. Such means are best shown in Fig. 14. Automatic circuit breaker push rods 90 and 91 extend through the intermediate partition 10 into yielding contact with the rear surface of the reversing switch.

The ends of these push rods are illustrated in Figs. 11 and 12 and the relationship of one of said rods, namely, rod 91, with the rest of the device will be described with reference to Fig. 14. It will be seen that the rod 91 extends through the horizontal member 43 into engagement with a rocker arm 92 pivoted on a bracket 93 connected to the horizontally extending structural member 43. A leaf spring 94 normally urges the end of rocker arm 92 against the end of the push rod 91. The opposite end of the rocker arm 92 carries an adjustable shoe 95 which extends into close proximity with the rear wall of compartment 16. At a suitable point on the back panel of compartment 16 (approximately one-half the height of such compartment in the instant case) is a cam block 96 so that when compartment 16 reaches its upper limit of travel, the cam block 96 engages the shoe 95 and rocker arm 92 actuates push rod 91 which then moves against the reversing switch 70 and throws it into neutral position.

In other words, if push button 8 shown in Figs. 11 and 12 is depressed so that the reversing switch 70 is moved into such position that contact is made with the terminals on the rear right side of the switch and on the front left side of the switch, the compartment in the right hand side of the device will move upwardly. When this compartment on the right hand side of the machine, namely, compartment 16, reaches its upper limit of travel, the cam 96 will actuate the push rod 91 so as to move the reversing switch back into neutral position, thereby preventing further unnecessary and undesirable energization of the driving motor 52. It is to be understood that a similar cam 97 is carried on the rear surface of the adjacent vertically movable compartment 15 and actuates the corresponding rod 90.

Figure 9:
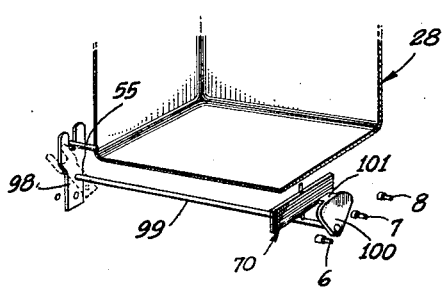
Fig. 9 is a perspective sectional view through a control mechanism embodied in the device.
Figure 10:
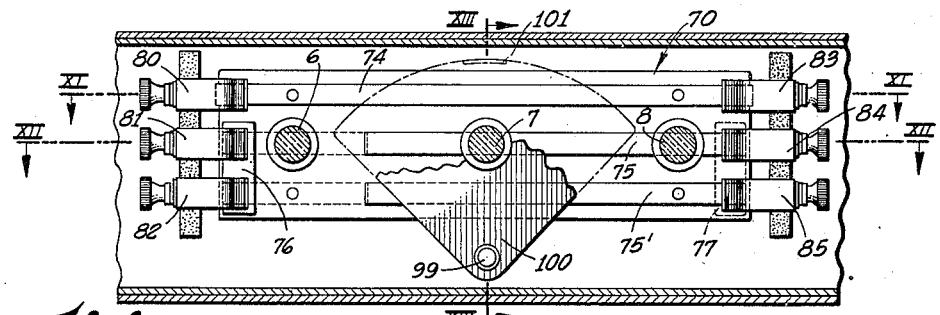
Fig. 10 is a front view of the improved flat rocker type reversing switch employed in controlling the operation of the device.
Figure 13:
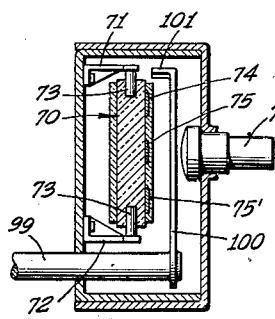
Fig. 13 is a transverse section taken along the plane XIII—XIII of Fig. 10.

Means are also provided for automatically centering the device into the position indicated in Fig. 2. Such means may include a yoke 98 provided with a bifurcated end portion forming a fork capable of engaging the pin 55 extending from the laterally movable compartment 28. This member 98 may be pivoted upon a rod 99 extending forwardly through the partition 10, such rod carrying a sector 100 having a rearwardly extending lip 101. In accordance with the conditions named hereinabove, as the laterally movable compartment 28 moved from right to left, pin 55 would engage the fork 98 and move it into an inclined dotted position shown in Fig. 9. In such inclined position the lip 101 of the member 100 would slide over the face of the reversing switch so that in the event the compartment 16 has reached its maximum upward travel and it is now desired to bring the compartments back to an intermediate position shown in Figs. 2 and 6, it is only necessary to press the center button 7 on the control panel, pressure of the button 7 against the member 100 causing pressure to be applied against the left side of the reversing switch through the lip 101 in contact with such left side of the switch, thereby pivoting the entire reversing switch into a position in which compartment 16 moves downwardly whereas compartment 15 moves upwardly. By maintaining pressure on button 7, a position is eventually reached wherein the laterally movable compartment 28 brings the forked member 98 into upright position whereupon the lip 101 falls off the face of the switch and extends above the upper edge thereof as shown in Fig. 13. Contacts are automatically broken at this point in view of the fact that the circuit breaking push rods 90 and 91 tend to place the reversing switch in neutral position. It will thus be seen that pressure on push button 6 will move the compartment on the left of the device upwardly; push button 7 will cause the compartments to stop in an intermediate position and push button 8 will cause the compartments in the right side of the device to move upwardly.

Figure 15:
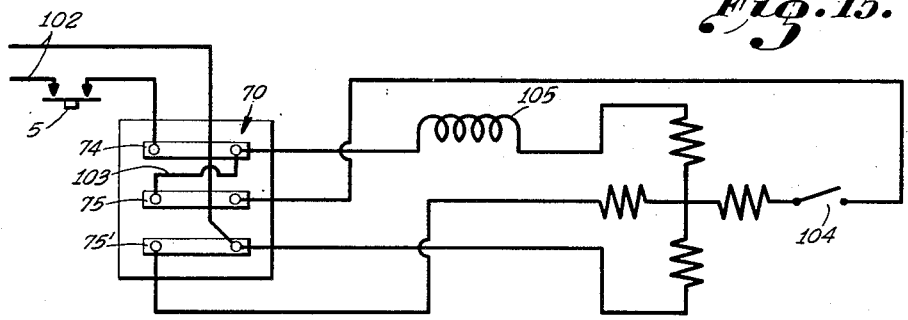
Figs. 15 and 16 are wiring diagrams illustrating the circuits controlled by the reversing switch.
Figure 16:
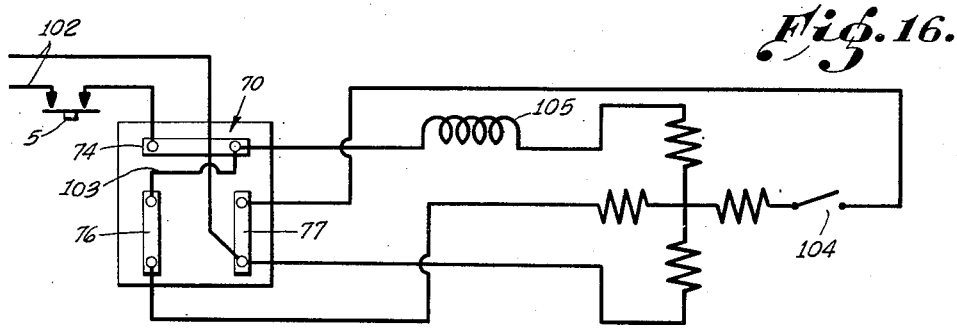

In view of the fact that the compartments may be rather heavily loaded with various supplies, tools, equipment, pots, pans, commodities, etc., it is desirable to provide means for braking the motor drive and thereby preventing the compartments from crawling or sliding past a desired stoppage point. The reversing motor 52 may be provided with a spring-actuated brake which prevents rotation of the motor shaft at all times, such brake being only released when an actuating release coil is energized. Since mechanisms of this sort are well known in the art, it is not necessary to describe them in detail but by referring to Figs. 15 and 16 which diagrammatically illustrate the reversing switch and the circuits connecting the same with a split phase motor, it will be evident how the brake release coil is energized whenever the circuit is closed. It will be noted that the incoming power line leads are indicated at 102. The reversing switch is generally indicated at 70 and the parallel and cross-conducting bars heretofore described in connection with Figs. 10 to 13 are indicated.

A jumper wire 103 is shown permanently connecting opposite ends of the parallel conductor bars 74 and 75. An automatic cut-out switch (common in split phase reversible motors) is indicated at 104. The function of the safety switch 5 is also apparent. It will be seen that even though contacts have been made by the reversing switch 70, the circuit itself is not energized until the safety switch 5 has been closed. For this reason, the operator needs to use both hands in causing the compartments to move, one hand operating the safety switch 5 whereas the other hand operates the desired push button 6, 7 or 8 of the reversing switch. By thus employing both hands, the housewife is automatically prevented from reaching into the device while the compartments are moving and accidents are thereby minimized. As soon as the safety switch 5 is closed, however, current will flow through the brake release coil indicated at 105, thereby releasing the brake on the motor and permitting rotation of the motor in the desired direction.

When the direction of the motor is to be reversed, pressure of the other control button will immediately cause contacts to be made as shown in Fig. 16, but again the circuit is not closed until the safety switch 5 has been closed and movement of the compartments does not take place until the brake release coil 105 is energized. The brake will be applied as soon as pressure is removed from the safety switch 5 or as soon as the reversing switch 70 is moved into a neutral position by the automatic circuit breaking devices heretofore described.

The description given hereinabove explains the preferred construction as well as the operation of the device. Attention is called to the fact that the embodiment specifically referred to is extremely compact and in the illustrative example where the housing occupied a total of 48 cubic feet of space, 30 cubic feet of effective storage space was provided. Moreover, this device, occupying a floor area of only 8 square feet, gave rise to 100 square feet of effective shelf space, this shelf space being readily accessible to the user. The pivotal movement of the driving means, the improved form of reversing switch, the automatic devices for stoppping movement of the compartments at desired positions, as well as the fact that positive drive is only imparted to the laterally movable compartment and not directly to the vertically movable compartments, combine in producing an efficient, compact, safe, household appliance. Inasmuch as the two main compartments 15 and 16 are counterbalanced, a motor of only low horse power need be used.

An even greater amount of shelf space can be rendered useful in a housing of the same dimensions by using two compartments such as 28 in adjoining relation. Such modification can be understood by visualizing two such smaller compartments in the upper portion of Fig. 6, one being above each of the main compartments 15 and 16. Figs. 17 to 20 inclusive show such a modified construction in diagrammatic form, the two laterally movable compartments being indicated by the numerals 128 and 129. In Fig. 17 the double compartment 15' is shown at the bottom whereas the large compartment 16' is at the top of its travel. Both of the laterally movable compartments 128 and 129 are in superimposed relation above 15'. The driving mechanism first moves the compartment 16' downwardly to an intermediate position as shown in Fig. 18, and the laterally movable compartment 128 is shifted laterally (to the level in Fig. 18) until it is in alignment with compartment 16', as shown in Fig. 19, whereupon compartment 15', together with its vertically aligned compartment 129, is raised to the intermediate position. If it is desired to make the lower portion of compartment 15' available, a similar sequence of operations is performed, the vertically movable compartment 16' plus its aligned compartment 128 being lowered, this movement being followed by a lateral movement of compartment 129 until it is in vertical alignment with compartment 128. The compartment 15' is then raised to its uppermost position, as shown in Fig. 20. Those skilled in the art may readily modify the timing and driving means disclosed hereinbefore to automatically accomplish the desired movements.

It is to be understood that the invention is not limited to the use of materials specifically mentioned. Various plastics, impregnated and treated woods and plywoods, etc., may be used with advantage in constructing the utensilator. Cables may be used instead of chains. Details of construction, types of controlling devices, etc., may be modified greatly without departing inventively from the disclosures herein made and claimed.

Many elements of construction herein disclosed may be adapted to other forms of devices. Furthermore, the arrangement, location, size and extent of the device may be varied in accordance with the use to which it is directed. All changes and modifications coming within the scope of the appended claims are embraced thereby.

I claim:

1. In a portable device of the character described, a generally rectangular housing provided with vertically extending corner guides and vertical intermediate guides arranged to define two adjacent wells, said intermediate guides being shorter, whereby said wells are in open communication with each other in the upper portion of the housing; a vertically movable compartment in each well guided by the guides; means comprising a flexible connection extending between said compartments for suspending the same in counterbalanced relation; a laterally movable compartment in the upper portion of the housing above the wells; a horizontally extending door in said housing; means for holding said door open in a horizontal plane to form a work table, said door being adapted to provide access to the compartments in said housing; means for moving said laterally movable compartment from one well to the other in the upper portion of the housing and for raising and lowering the same in either of said wells and for simultaneously imparting vertical motion to said vertically movable compartments comprising: a continuous chain extending horizontally between middle portions of said vertically movable compartments and vertically along said middle portions, a connection between said laterally movable compartment and said chain, and means whereby the bottom of the laterally movable compartment may be engaged with the top of each of said vertically movable compartments.

2. In a portable device of the character described, a generally rectangular housing provided with vertically extending corner guides and vertical intermediate guides arranged to define two adjacent wells, said intermediate guides being shorter, whereby said wells are in open communication with each other in the upper portion of the housing; a vertically movable compartment in each well guided by the guides; means comprising a flexible connection extending between said compartments for suspending the same in counterbalanced relation; a laterally movable compartment in the upper portion of the housing above the wells; a horizontally extending door in said housing; means for holding said door open in a horizontal plane to form a work table, said door being adapted to provide access to the compartments in said housing; means for moving said laterally movable compartment from one well to the other in the upper portion of the housing and for raising and lowering the same in either of said wells and for simultaneously imparting vertical motion to said vertically movable compartments comprising: a continuous chain extending horizontally between middle portions of said vertically movable compartments and vertically along said middle portions, a connection between said laterally movable compartment and said chain, means whereby the bottom of the laterally movable compartment may be engaged with the top of each of said vertically movable compartments, and an electrical circuit including a reversible driving motor for said chain, a reversing switch for said motor, a separate push button type safety switch in series with said reversing switch and a brake release coil adapted to be energized when said circuit is closed.

3. In a portable device of the character described, a generally rectangular housing provided with vertically extending corner guides and vertical intermediate guides arranged to define two adjacent wells, said intermediate guides being shorter, whereby said wells are in open communication with each other in the upper portion of the housing; a vertically movable compartment in each well guided by the guides; means comprising a flexible connection extending between said compartments for suspending the same in counterbalanced relation; a laterally movable compartment in the upper portion of the housing above the wells; a horizontally extending door in said housing; means for holding said door open in a horizontal plane to form a work table, said door being adapted to provide access to the compartments in said housing; means for moving said laterally movable compartment from one well to the other in the upper portion of the housing and for raising and lowering the same in either of said wells and for simultaneously imparting vertical motion to said vertically movable compartments comprising: a continuous chain extending horizontally between middle portions of said vertically movable compartments and vertically along said middle portions, a connection between said laterally movable compartment and said chain, means whereby the bottom of the laterally movable compartment may be engaged with the top of each of said vertically movable compartments; an electrical circuit including a reversible driving motor for said chain, a reversing switch for said motor, a separate push button type safety switch in series with said reversing switch and a brake release coil adapted to be energized when said circuit is closed, and a circuit breaking means actuated by said compartments and adapted to place said reversing switch in neutral position.

4. In a device of the character described, the combination of: a generally rectangular housing provided with vertically extending corner guides and vertical intermediate guides adapted to define two adjacent vertical wells, said wells being in open communication with each other in the upper portion of the housing; a vertically movable compartment, guided by said guides, in each well; means including a flexible connection extending between said compartments and suspending the same in counterbalanced relation; laterally extending guides carried by the top of each of said compartments; a laterally movable compartment in the upper portion of the housing; guide engaging means carried by the bottom of said laterally movable compartment; driving means for selectively moving said laterally movable compartment and thereby raising and lowering said vertically movable compartments; a door in said housing, and means for holding said door open in a horizontal plane to form a work table, said door being adapted to provide access to the compartments in said housing.

5. In a device of the character described, the combination of: a housing provided with vertically extending corner guides and vertical intermediate guides adapted to define two adjacent wells, said intermediate guides being shorter, whereby said wells are in open communication with each other in the upper portion of the housing; a vertically movable compartment in each well guided by the guides; means comprising a flexible connection extending between said compartments and suspending the same in counterbalanced relation; laterally extending guides carried by the top of each of said compartments; a laterally movable compartment in the upper portion of the housing; means carried by the bottom of said laterally movable compartment for engaging the lateral guides on the top of the first named compartment; driving means for selectively moving said laterally movable compartment horizontally from one well to the other in the upper portion of the housing and for raising and lowering said vertically movable compartments; a motor mounting pivotally suspended between said intermediate guides; a motor carried by said mounting; a continuous chain driven by said motor; a pin carried by the laterally movable compartment and engaging said chain; a horizontally extending door in said housing giving access to compartments in both wells; and means for holding said door open in a horizontal plane to form a work table.

6. In a device of the character described, the combination of: a generally rectangular housing provided with vertically extending corner guides and vertical intermediate guides adapted to define two adjacent wells; said intermediate guides terminating at a plane spaced from the top of the housing whereby said wells are in open communication with each other in the upper portion of the housing; a vertically movable compartment in each well guided by the guides; means comprising a flexible connection extending between said compartments for suspending the same in counterbalanced relation; a laterally movable compartment in the upper portion of the housing; driving means for selectively moving said laterally movable compartment and for raising and lowering said vertically movable compartments; a doorway extending horizontally throughout the front of the housing, said doorway being adapted to provide access to the compartments in both wells of said housing.

7. In a portable device of the character described, a generally rectangular housing provided with vertically extending corner guides and vertical intermediate guides arranged to define two adjacent wells, said intermediate guides being shorter, whereby said wells are in open communication with each other in the upper portion of the housing; a vertically movable compartment in each well guided by the guides; means comprising a flexible connection extending between said compartments for suspending the same in counterbalanced relation; a laterally movable compartment in the upper portion of the housing; a horizontally extending doorway in the front wall of said housing, said doorway being adapted to provide access to the compartments in both wells of said housing; means for moving said laterally movable compartment from one well to the other in the upper portion of the housing and for raising and lowering the same in either of said wells into position accessible through said doorway and for simultaneously imparting vertical motion to said vertically movable compartments comprising: a continuous chain extending horizontally between middle portions of said vertically movable compartments and vertically along said middle portions, a connection between said laterally movable compartment and said chain; means whereby the bottom of said laterally movable compartment may be engaged with the top of either of said vertically movable compartments, and an electrical circuit including a reversing switch in proximity to said door for selectively energizing said means for moving compartments.

8. In a portable device of the character described, a generally rectangular housing provided with vertically extending corner guides and vertical intermediate guides arranged to define two adjacent wells, said intermediate guides being shorter, whereby said wells are in open communication with each other in the upper portion of the housing; a vertically movable compartment in each well guided by the guides; means comprising a flexible connection extending between said compartments for suspending the same in counterbalanced relation; a laterally movable compartment in the upper portion of the housing; a horizontally extending doorway in said housing, said doorway being adapted to provide access to the compartments in both wells of said housing; means for moving said laterally movable compartment from one well to the other in the upper portion of the housing and for raising and lowering the same in either of said wells and for simultaneously imparting vertical motion to the vertically movable compartment therebelow comprising: a continuous chain extending horizontally between middle portions of said vertically movable compartments and vertically along said middle portions, a connection between said laterally movable compartment and said chain; means for releasably engaging the bottom of said laterally movable compartment with the top of either of said vertically movable compartments whereby the laterally movable compartment may move vertically with either of the vertically movable compartments; an electrical circuit for said compartment moving means including a reversible driving motor for said chain, and a flat rocker-type reversing snap switch having a neutral position and two push buttons to operate said switch.

9. In a portable device of the character described, a generally rectangular housing provided with vertically extending corner guides and vertical intermediate guides arranged to define two adjacent wells, said intermediate guides being shorter, whereby said wells are in open communication with each other in the upper portion of the housing; a vertically movable compartment in each well guided by the guides; means comprising a flexible connection extending between said compartments for suspending the same in counterbalanced relation; a laterally movable compartment in the upper portion of the housing; a horizontally extending doorway in the front of said housing, said doorway being arranged to provide access to the compartments in both wells of said housing; means for moving said laterally movable compartment from one well to the other in the upper portion of the housing and for raising and lowering the same in either of said wells and for simultaneously imparting vertical motion to said vertically movable compartments comprising: a continuous chain extending horizontally between middle portions of said vertically movable compartments and vertically along said middle portions, a connection between said laterally movable compartment and said chain; means whereby the bottom of said laterally movable compartment may be releasably engaged with the top of either of said vertically movable compartments; an electrical circuit for said compartment moving means including a reversible driving motor for said chain, a flat rocker-type reversing snap switch having a neutral position; two push buttons to operate said switch; a separate push button type safety switch in series with said reversing switch, and circuit breaking means actuated by said compartments and adapted to place said reversing switch in neutral position.

10. In a portable device of the character described, a generally rectangular housing provided with vertically extending corner guides and vertical intermediate guides arranged to define two adjacent wells, said intermediate guides being shorter, whereby said wells are in open communication with each other in the upper portion of the housing; a vertically movable compartment in each well guided by the guides; means comprising a flexible connection extending between said compartments for suspending the same in counterbalanced relation; a laterally movable compartment in the upper portion of the housing; a horizontally extending doorway in said housing, said doorway being adapted to provide access to the compartments in said housing; means for moving said laterally movable compartment from one well to the other in the upper portion of the housing and for raising and lowering the same in either of said wells and for simultaneously imparting vertical motion to the vertically movable compartment therebelow comprising: a continuous chain extending horizontally between middle portions of said vertically movable compartments and vertically along said middle portions, a connection between said laterally movable compartment and said chain, means whereby the bottom of said laterally movable compartment may be releasably engaged with the top of either of said vertically movable compartments for movement therewith; an electrical circuit including a reversible driving motor for said chain, a reversing switch for said motor, a separate push button type safety switch in series with said reversing switch and a brake release coil adapted to be energized when said circuit is closed; a circuit breaking means actuated by said compartments and adapted to place said reversing switch in neutral position and means for locking said reversing switch.

11. In a device including adjacent, vertically movable compartments, the combination of: reversible motor driving means for raising and lowering said compartments, a flat, rocker type, reversible snap switch operably connected to said reversible motor, a push rod in operative relation to each end of said switch, and means actuated by a compartment at a desired point of travel thereof for moving said push rod into engagement with said switch to break the circuit to said reversible motor.

12. In a storage and dispensing cabinet, a generally rectangular housing provided with vertically extending corner guides and vertical intermediate guides adapted to define two adjacent wells, said intermediate guides being shorter, whereby said wells are in open communication with each other in the upper portion of the housing, a vertically movable and laterally immovable compartment in each well guided by said guides, a horizontally extending doorway in said housing, said doorway being at a position above the level of the vertically movable compartments when they are at the bottom of the wells, a pair of smaller compartments in the upper portion of the housing, said smaller compartments being arranged to move vertically into each of said vertical wells and laterally in the upper portion of the housing, and controllable means for driving said compartments.

13. In a storage and dispensing cabinet including a generally rectangular housing provided with internal, vertically extending corner guides and vertical intermediate guides adapted to define two adjacent wells, said wells being in open communication with each other in the upper portion of the housing; a main, vertically movable compartment in each well guided by said vertical guides; a doorway in the front of the housing at a position above the level of the vertically movable compartments when they are at the bottom of the wells, said doorway being adapted to provide access to compartments in both wells; a compartment movable laterally from one well to the other in the upper portion of the housing and vertically in either well with the main vertically movable compartment therebelow, a driving means for moving said laterally movable compartment, and means for translating vertical motion of the laterally movable compartment in either well into vertical motion of the main compartments.

14. A device of the character stated in claim 13 characterized in that the means for translating vertical motion of the laterally movable compartment into vertical motion of the main compartments include means carried by the top of each of the main compartments for releasably engaging the bottom of the laterally movable compartment.

15. A device of the character described in claim 13 characterized in that the driving means is provided with manually operable controls for initiating operation of the driving means, and automatic means for stopping the driving means when said main compartments are at top and bottom positions within said wells.

16. In a household type storage device, the combination of: a generally rectangular housing provided with vertically extending corner guides and vertical intermediate guides adapted to define two adjacent wells, said intermediate guides being shorter, whereby said wells are in open communication with each other in the upper portion of the housing; a vertically movable compartment guided by the guides in each well; a laterally movable compartment movable laterally in the upper portion of the housing and vertically movable when in alignment with a vertically movable compartment therebelow; and means for moving said laterally movable compartment horizontally from one well to the other in the upper portion of the housing.

17. A device of the character described in claim 16 wherein the means for moving the laterally movable compartment horizontally from one well to the other comprises a motor, a continuous chain driven by said motor, and a connection between the laterally movable compartment and said chain.

18. In a household type storage device, the combination of: a generally rectangular housing provided with vertically extending corner guides and vertical intermediate guides adapted to define two adjacent wells, said intermediate guides being shorter, whereby said wells are in open communication with each other in the upper portion of the housing; a laterally movable compartment in the upper portion of the housing, said laterally movable compartment being movable laterally in the upper portion and vertically when in alignment with the vertical guides defining either of said wells; and means for moving said laterally movable compartment horizontally from above one well to the other comprising a motor mounting suspended upon a pivotal axis lying between said wells, a motor carried by said mounting, a continuous chain having a section extending horizontally in the upper portion of the housing between middle portions of said wells and including vertical sections of the chain along middle portions of said wells, said chain being driven by said motor, and a connection between said laterally movable compartment and said chain.

19. In a household type storage device, the combination of: a generally rectangular housing provided with vertically extending corner guides and vertical intermediate guides adapted to define two adjacent wells, said intermediate guides being shorter, whereby said wells are in open communication with each other in the upper portion of the housing; a laterally movable compartment in the upper portion of the housing, said laterally movable compartment being movable laterally in the upper portion and vertically when in alignment with the vertical guides defining either of said wells; means for moving said laterally movable compartment horizontally from above one well to the other comprising a motor mounting suspended upon a pivotal axis lying between said wells, a reversible motor carried by said mounting, a continuous chain having a section extending horizontally in the upper portion of the housing between middle portions of said wells and including vertical sections of the chain along middle portions of said wells, said chain being driven by said motor, and a connection between said laterally movable compartment and said chain; and an electrical circuit including said reversible motor and a reversing switch having a neutral position and two push buttons to operate said switch.

20. A device of the character stated in claim 16 including a counterbalancing connection between said vertically movable compartments and means for transmitting vertical motion of the laterally movable compartment to said vertically movable compartments when they are in alignment.

21. A household type storage device comprising: a generally rectangular housing having side, front and back walls and a top; a vertical, transverse partition connecting the front and back of the housing, said partition cooperating with the sides, front and back of the housing to define two adjacent wells, said partition terminating short of the top, whereby said wells are in open communication with each other in the upper portion of the housing; a vertically movable compartment in each well; guides between each compartment and the walls of the housing; means comprising a flexible connection extending between said compartments for suspending the same in counterbalanced relation; a laterally movable compartment in the upper portion of the housing above the wells; and a controllable means for driving said compartments to move the laterally movable compartment horizontally in said upper portion and vertically when in alignment with a vertically movable compartment therebelow.

22. A household type storage device comprising: a generally rectangular housing having side, front and back walls and a top; a vertical, transverse partition connecting the front and back of the housing, said partition cooperating with the sides, front and back of the housing to define two adjacent wells, said partition terminating short of the top, whereby said wells are in open communication with each other in the upper portion of the housing; a vertically movable compartment in each well; guides between each compartment and the walls of the housing; means comprising a flexible connection extending between said compartments for suspending the same in counterbalanced relation; a laterally movable compartment in the upper portion of the housing above the wells; and a controllable means for driving said compartments to move the laterally movable compartment horizontally in said upper portion and vertically when in alignment with a vertically movable compartment therebelow, said controllable driving means including a reversible motor, a continuous chain driven by said motor, a connection between said laterally movable compartment and said chain, a rocker type reversible snap switch operably connected to said reversible motor, a push rod in operative relation to each end of said switch and means actuated by a compartment at a desired point of travel thereof for moving said push rod into engagement with said switch to break the circuit to said reversible motor.

23. A household type storage device comprising: a generally rectangular housing having side, front and back walls and a top; a vertical, transverse partition connecting the front and back of the housing, said partition cooperating with the sides, front and back of the housing to define two adjacent wells, said partition terminating short of the top, whereby said wells are in open communication with each other in the upper portion of the housing; a vertically movable compartment in each well; guides between each compartment and the walls of the housing; means comprising a flexible connection extending between said compartments for suspending the same in counterbalanced relation; a laterally movable compartment in the upper portion of the housing above the wells; a controllable means for driving said compartments to move the laterally movable compartment horizontally in said upper portion and vertically when in alignment with a vertically movable compartment therebelow; and means whereby the bottom of said laterally movable compartment may be releasably engaged with the top of either of said vertically movable compartments.

24. In a generally rectangular housing having side, front, and back walls, a top and a horizontally extending doorway in the front wall: a transverse partition terminating short of the top but extending to the top of the doorway, said partition dividing the housing into two vertical adjacent wells, said wells being in open communication with each other in the upper portion of the housing above said partition; a vertically movable compartment in each well; guides between each of said compartments and the walls of the housing; a flexible connection extending between the compartments for suspending the same in counterbalanced relation; a laterally movable compartment in the upper portion of the housing above the wells; and means for moving the laterally movable compartment horizontally in the upper portion of the housing into position above either of the wells and for moving such laterally movable compartment vertically with a vertically movable compartment therebelow.

25. In a generally rectangular housing having side, front, and back walls, a top and a horizontally extending doorway in the front wall: a transverse partition terminating short of the top but extending to the top of the doorway, said partition dividing the housing into two vertical adjacent wells, said wells being in open communication with each other in the upper portion of the housing above said partition; a vertically movable compartment in each well; guides between each of said compartments and the walls of the housing; a flexible connection extending between the compartments for suspending the same in counterbalanced relation; a laterally movable compartment in the upper portion of the housing above the wells; and controllable means for moving the laterally movable compartment horizontally in the upper portion of the housing and vertically when in alignment with a vertically movable compartment therebelow, said controllable means including a continuous, flexible driving element, a connection between the driving element and the laterally movable compartment, and a reversible motor for driving the driving element.

26. In a generally rectangular housing having side, front, and back walls, a top and a horizontally extending doorway in the front wall: a transverse partition terminating short of the top but extending to the top of the doorway, said partition dividing the housing into two vertical adjacent wells, said wells being in open communication with each other in the upper portion of the housing above said partition; a vertically movable compartment in each well; guides between each of said compartments and the walls of the housing; a flexible connection extending between the compartments for suspending the same in counterbalanced relation; a laterally movable compartment in the upper portion of the housing above the wells; means carried by the laterally movable compartment for sliding engagement with the top of a vertically movable compartment when the laterally movable compartment is moved in the upper portion of the housing into position above a well; and controllable means for moving the laterally movable compartment horizontally in the upper portion of the housing and vertically when in alignment with a vertically movable compartment therebelow, said controllable means including a continuous, flexible driving element, a connection between the driving element and the laterally movable compartment, and a reversible motor for driving the driving element.

27. A household type storage device comprising: a generally rectangular housing having side, front and back walls and a top; vertical partition members carried by the front and back walls of the housing and extending inwardly toward each other, said partition members cooperating with the sides, front and back of the housing to define two adjacent, vertical wells in the housing; a vertically movable compartment in each well; means comprising a flexible connection extending between said compartments for suspending the same in counterbalanced relation; and means for controllably driving said flexible connection, including a motor mounting suspended upon a pivotal axis lying between the lower portions of said wells and extending in a front to back direction, a reversible motor carried by said mounting and a driving connection between the motor and the flexible connection, whereby said mounting may pivot on said axis to move the motor out of the way of a compartment when the compartment is at the lower position of its travel in a well.

CHARLES F. ROSSETTER.

REFERENCES CITED

The following references are of record in the file of this patent:

UNITED STATES PATENTS

| Number | Name | Date |
| --- | --- | --- |
| 582,004 | Szczys | May 4, 1897 |
| 636,107 | Bieque | Oct. 31, 1899 |
| 1,345,367 | Johnson | July 6, 1920 |
| 1,626,461 | Goff | Apr. 26, 1927 |
| 1,996,891 | Van Valkenburg | Apr. 9, 1935 |